United States Patent
Chan

(10) Patent No.: US 8,537,130 B2
(45) Date of Patent: Sep. 17, 2013

(54) PORTABLE ELECTRONIC DEVICE AND UNLOCKING METHOD USING STYLUS

(75) Inventor: Caryn Chan, Taoyuan (TW)

(73) Assignee: FIH (Hong Kong) Limited, Kowloon (HK)

( * ) Notice: Subject to any disclaimer, the term of this patent is extended or adjusted under 35 U.S.C. 154(b) by 174 days.

(21) Appl. No.: 13/172,864

(22) Filed: Jun. 30, 2011

(65) Prior Publication Data

US 2012/0127096 A1    May 24, 2012

(30) Foreign Application Priority Data

Nov. 18, 2010   (TW) ................................ 099139638

(51) Int. Cl.
*G06F 3/041*    (2006.01)
(52) U.S. Cl.
USPC .......................................... 345/173; 345/179
(58) Field of Classification Search
USPC ............................. 345/156, 173, 179, 204, 214
See application file for complete search history.

(56) References Cited

U.S. PATENT DOCUMENTS

| | | | | |
|---|---|---|---|---|
| 5,067,573 A * | 11/1991 | Uchida | ......................... | 345/173 |
| 5,483,262 A * | 1/1996 | Izutani | ......................... | 345/179 |
| 5,635,959 A * | 6/1997 | Takeuchi et al. | ............... | 345/179 |
| 5,889,237 A * | 3/1999 | Makinwa | ................... | 178/18.01 |
| 6,114,958 A * | 9/2000 | Murphy | ...................... | 340/568.1 |
| 6,233,464 B1 * | 5/2001 | Chmaytelli | ................ | 455/556.2 |
| 6,473,076 B1 * | 10/2002 | Thompson et al. | ............ | 345/179 |
| 6,518,957 B1 * | 2/2003 | Lehtinen et al. | .............. | 345/173 |
| 6,681,333 B1 * | 1/2004 | Cho | .............................. | 713/300 |
| 7,036,026 B2 * | 4/2006 | Hammer | ...................... | 713/300 |
| 7,210,046 B2 * | 4/2007 | Truong | ........................ | 713/300 |
| 7,623,121 B2 * | 11/2009 | Dodge | ......................... | 345/179 |
| 7,705,837 B2 * | 4/2010 | Locker et al. | ................. | 345/179 |
| 7,834,863 B2 * | 11/2010 | Lee | ............................... | 345/179 |
| 7,994,913 B2 * | 8/2011 | Lee | ............................... | 340/568.1 |
| 2002/0103616 A1 * | 8/2002 | Park et al. | ...................... | 702/150 |
| 2005/0270167 A1 * | 12/2005 | Lai et al. | ....................... | 340/687 |
| 2006/0174139 A1 * | 8/2006 | Keely et al. | ................... | 713/300 |
| 2007/0063994 A1 * | 3/2007 | Carlson et al. | ................ | 345/179 |
| 2009/0315922 A1 * | 12/2009 | Lee | ............................... | 345/698 |

* cited by examiner

*Primary Examiner* — Joe H Cheng
(74) *Attorney, Agent, or Firm* — Altis Law Group, Inc.

(57) ABSTRACT

A method unlocks a portable electronic device using a stylus. A user can remove the stylus received in a receiving space of the portable electronic device to unlock the portable electronic device. In an unlocking procedure, a detection circuit detects whether the stylus has been removed from the portable electronic device and outputs a corresponding logic value of the portable electronic device. If the logic value of the detection circuit has changed from "0" to "1", the locked portable electronic device is unlocked.

10 Claims, 3 Drawing Sheets

PORTABLE ELECTRONIC DEVICE AND UNLOCKING METHOD USING STYLUS

BACKGROUND

1. Technical Field

Embodiments of the present disclosure relate to unlocking methods of an electronic device, and more particularly to an unlocking method of a portable electronic device using a stylus and the portable electronic device thereof.

2. Description of Related Art

A common unlocking technique for a portable electronic device having a touch screen is to input an alpha-numeric passcode using a finger or a stylus touching a virtual keypad displayed on the touch screen of the portable electronic device. However, remembering the alpha-numeric passcode may be difficult for the user. Furthermore, touching the virtual keypad displayed on the touch screen with the stylus is sometimes not convenient for the user. What is needed, therefore, is an unlocking method of the portable electronic device to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
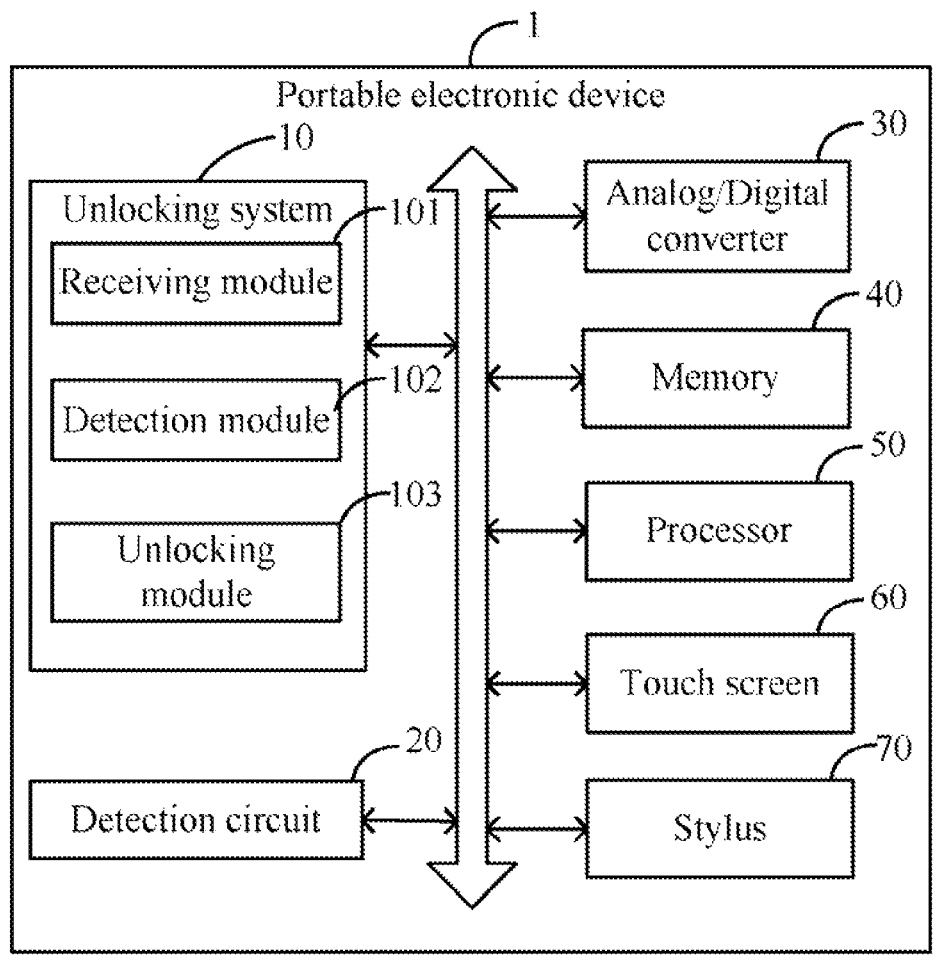
FIG. 1 is a block diagram of one embodiment of a portable electronic device.

FIG. 1 is a block diagram of one embodiment of a portable electronic device 1. Depending on the embodiment, the portable electronic device 1 may be a mobile phone, a personal digital assistant (PDA), a handheld game console, a digital camera (DC), or a handheld computer. The portable electronic device 1 includes a detection circuit 20, an analog/digital converter 30, a memory 40, at least one processor 50, a touch screen 60, a stylus 70 and an unlocking system 10 including a receiving module 101, a detection module 102, and an unlocking module 103.

The portable electronic device 1 is generally controlled and coordinated by an operating system software, such as UNIX, LINUX, WINDOWS, an embedded operating system, or any other compatible operating systems. In other embodiments, the portable electronic device 1 may be controlled by a proprietary operating system. Conventional operating systems control and schedule computer processes for execution, performing memory management, providing file system, networking, and I/O services, and providing a user interface, such as a graphical user interface (GUI), among other things.

The portable electronic device 1 can receive the stylus 70 in a receiving space of the portable electronic device 1. The receiving space can be positioned in one side of the portable electronic device 1. For example, the receiving space can be a slot on the left side or right side of the portable electronic device 1. In one embodiment, if a user needs to use the stylus 70 to contact the touch screen 60, the stylus 70 can be taken out from the receiving space of the portable electronic device 1.

Figure 2A:
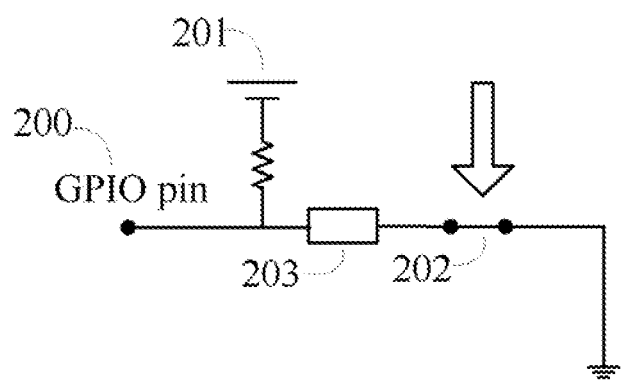
FIG. 2A-2B are schematic diagrams of one embodiment of a detection circuit of the portable electronic device of FIG. 1.
Figure 2B:
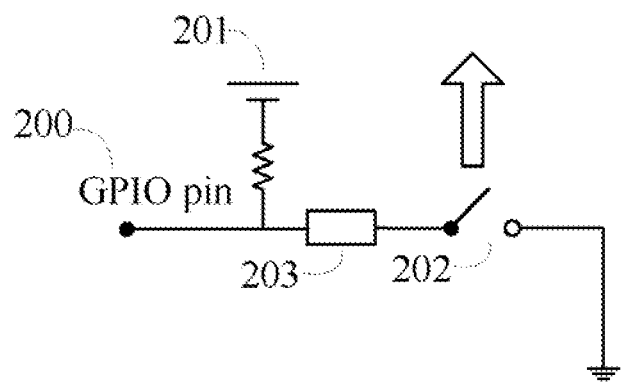

As shown in FIG. 2A and FIG. 2B, are schematic diagrams of one embodiment of the detection circuit 20 of the portable electronic device 1. The detection circuit 20 includes a General Purpose Input/Output pin 200 (GPIO pin), a power 201, a switch 202 and a noise reduction circuit 203. The power 201 is operable to provide power to the GPIO pin 200 of the portable electronic device 1.

FIG. 2A is a schematic diagram of the detection circuit 20 of the portable electronic device 1 when the stylus 70 is received in the receiving space of the portable electronic device 1. FIG. 2A shows that the switch 202 is active and the GPIO pin 200 is grounded. Then the GPIO 200 is set as a low voltage. For example, the low voltage may be zero volts.

FIG. 2B is the schematic diagram of the detection circuit 20 of the portable electronic device 1 if the stylus 70 is not received in the receiving space of the portable electronic device 1. FIG. 2A shows that the switch 202 is inactive and the GPIO pin 200 is connected to the power 201. Then the GPIO pin 200 is set as a high voltage, such as one volt. Furthermore, the detection circuit 20 continually detects the voltage of the GPIO pin 200 to indicate whether the stylus 70 is received in the receiving space of the portable electronic device 1.

The switch 202 is operable to switch on or switch off the detection circuit 20. The switch 202 is positioned in the receiving space of the portable electronic device 1. In one embodiment, when the stylus 70 is received in the receiving space of the portable electronic device 1, the stylus 70 generates an extrusion force to make the switch 202 closed and activated. In other embodiments, when the stylus 70 is not received in the receiving space of the portable electronic device 1, the switch 202 is not forced with the stylus 70 and the switch 202 is not closed and inactive.

The noise reduction circuit 203 is positioned between the GPIO pin 200 and the switch 202. When the switch 202 is switched on or is switched off, the switch 202 generates noise to affect accuracy of the voltage detected by the detection circuit 20. The noise reduction circuit 203 can reduce the noise generated by switching on or switching off the switch 202.

The analog/digital converter 30 is operable to transform the voltage detected by the detection circuit 20 into a corresponding logic value. In one embodiment, the analog/digital converter 30 is operable to transform the voltage of the GPIO pin 200 into the logic value. For example, the low voltage is transformed into a logic value "0" to indicate that the stylus 70 is received in the receiving space of the portable electronic device 1. For other examples, the high voltage is transformed into a logic value "1" to indicate that the stylus 70 is not received in the receiving space of the portable electronic device 1.

The modules 101-103 may comprise computerized code in the form of one or more programs that are stored in the memory 40. The computerized code includes instructions that are executed by the at least one processor 50 to provide functions for the modules 101-103. The at least one processor 50, as an example, may include a CPU, math coprocessor, or shift register.

The memory 40 is operable to store many kinds of data, such as the voltage detected by the detection circuit 20, a customization function code of the portable electronic device 1, computerized codes of the unlocking system 10, programs of an operating system and other applications of the portable electronic device 1. The memory 40 may include flash memory, RAM, ROM, cache, or external storage mediums.

The touch screen 60 is operable to display information of the portable electronic device 1 and receive touch input to the touch screen 60. In one embodiment, the touch screen 60 can receive the input from the stylus 70 or fingers. The touch screen 60 can be a resistive or a capacitive touch screen.

The receiving module 101 is operable to receive the logic value of the detection circuit 20. In one embodiment, the detection circuit 20 continually detects the voltage of the GPIO pin 200 and the analog/digital converter 30 transforms the voltage of the GPIO pin 200 into corresponding logic values. The receiving module 101 then receives the logic values from the analog/digital converter 30. Furthermore, the receiving module 102 saves the received logic values in the memory 40.

The detection module 102 is operable to detect whether the voltage of the GPIO pin 200 is changed from a low voltage to a high voltage according to the logic value of the GPIO pin 200. In one embodiment, the detection module 102 detects whether the logic value of the detection circuit 20 has changed from "0" to "1". If detecting that the logic value of the detection circuit 20 has changed from "0" to "1", the stylus 70 has been removed from the receiving space of the portable electronic device 1. If detecting that the logic value of the detection circuit 20 has changed from "1" to "0", the stylus 70 has been received in the receiving space of the portable electronic device 1.

The unlocking module 103 is operable to control the at least one processor 50 to unlock or wake up the portable electronic device 1. In one embodiment, if detecting the logic value of the detection circuit 20 has changed from "0" to "1", the unlocking module 103 controls the at least one processor 50 to unlock or wake up the portable electronic device 1.

Figure 3:
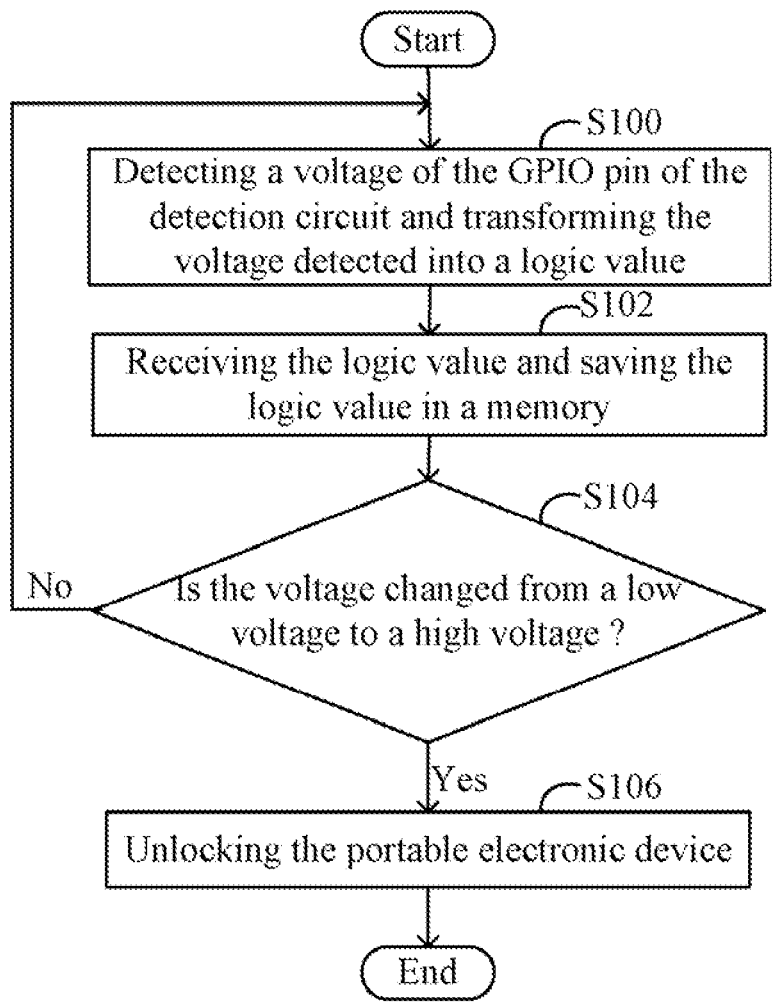
FIG. 3 is a flowchart of one embodiment of a method for unlocking a portable electronic device.

FIG. 3 is a flowchart of one embodiment of a method for unlocking a portable electronic device 1. Depending on the embodiment, additional blocks may be added, others deleted, and the ordering of the blocks may be changed.

In block S100, the detection circuit 20 detects a voltage of the GPIO pin 200 of the detection circuit 20 and the analog/digital converter 30 transforms the voltage detected into a corresponding logic value. In one embodiment, when the stylus 70 is received in the receiving space of the portable electronic device 1, the stylus 70 generates an extrusion force to make the switch 202 closed and activated, then the GPIO pin 200 is grounded and is set as a low voltage, such as zero volt. The analog/digital converter 30 transforms the low voltage into the logic value "0". When the stylus 70 is not received in the receiving space of the portable electronic device 1, the switch 202 is not forced with the stylus 70 and the switch 202 is not closed and inactive, then the GPIO pin 200 is connected to the power 201 and is set as a high voltage, such as one volt. The analog/digital converter 30 transforms the high voltage into the logic value "1".

In block S102, the receiving module 101 receives the logic value of the detection circuit 20 from the analog/digital converter 30. In addition, the receiving module 101 saves the logic value in the memory 40.

In block S104, the detection module 102 detects whether the voltage of the GPIO pin 200 is changed from a low voltage to a high voltage according to the logic value. In one embodiment, the detection module 102 can detect whether the logic value of the detection circuit 20 has changed from "0" to "1". If detecting the logic value of the detection circuit 20 has changed from "0" to "1", the stylus 70 is removed from the receiving space of the portable electronic device 1 and block S106 is implemented. If detecting the logic value of the detection circuit 20 has changed from "1" to "0", the stylus 70 is received in the receiving space of the portable electronic device 1 and block S100 is returned.

In block S106, the unlocking module 106 sends an unlock or a wake up signal to the at least one processor 50 and controls the at least one processor 50 to unlock or wake up the portable electronic device 1. In one embodiment, the lock state of the portable electronic device 1 is a screen lock or a key lock.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
  a touch screen;
  a memory;
  at least one processor;
  a detection circuit operable to detect a voltage indicating whether a stylus is received in a receiving space of the portable electronic device, wherein the detection circuit comprises a switch that is activated when the stylus is received in a receiving space of the portable electronic device, and is inactive when the stylus is not received in the receiving space; and a General Purpose Input/Output (GPIO) pin that is grounded in response to the switch being active, and the GPIO pin is set at a high voltage in response to the switch being inactive;
  an analog/digital converter operable to transform the voltage into a corresponding logic value;
  one or more programs that are stored in the memory and are executed by the at least one processor, the one or more programs comprising:
  a receiving module operable to receive the logic value;
  a detection module operable to detect whether the voltage is changed from a low voltage to a high voltage according to the logic value; and
  an unlocking module operable to control the at least one processor to unlock or wake up the portable electronic device if the voltage is changed from a low voltage to a high voltage.

2. The portable electronic device of claim 1, wherein the detection circuit further comprises a noise reduction circuit.

3. The portable electronic device of claim 2, wherein the noise reduction circuit is positioned between the switch and the GPIO pin.

4. The portable electronic device of claim 1, wherein the logic value is "0" or "1".

5. The portable electronic device of claim 1, wherein the at least one processor unlocks the portable electronic device with the stylus to unlock a screen lock or a key lock of the portable electronic device.

6. The portable electronic device of claim 1, wherein the receiving module further saves the logic value in the memory.

7. A method for unlocking a portable electronic device, the portable electronic device comprising a memory, a touch screen, a detection circuit, and an analog/digital converter, the method comprising:
- detecting a voltage indicating whether a stylus is received in a receiving space of the portable electronic device with the detection circuit;
- activating a switch when the stylus is received in a receiving space of the portable electronic device, and grounding a General Purpose Input/Output (GPIO) pin in response to the switch being active;
- inactivating the switch when the stylus is not received in the receiving space, and setting the GPIO at a high voltage in response to the switch being inactive;
- transforming the voltage into a corresponding logic value by the analog/digital converter;
- receiving the logic value and saving the logic value into the memory;
- detecting whether the voltage is changed from a low voltage to a high voltage according to the logic value; and
- unlocking or waking up the portable electronic device if the voltage is changed from a low voltage to a high voltage.

8. The method of claim 7, further comprising:
- returning to the step of detecting the voltage if the voltage is changed from the high voltage to the low voltage.

9. The method of claim 7, wherein the logic value is "0" or "1".

10. The method of claim 7, wherein the step of unlocking the portable electronic device is by unlocking a screen lock or a key lock of the portable electronic device.

* * * * *